May 14, 1940.  H. HEINZELMANN  2,200,744
BALANCED COMBUSTION ENGINE
Filed May 21, 1936
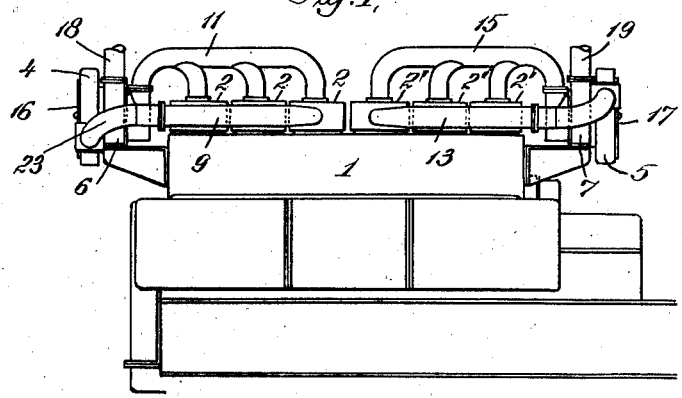
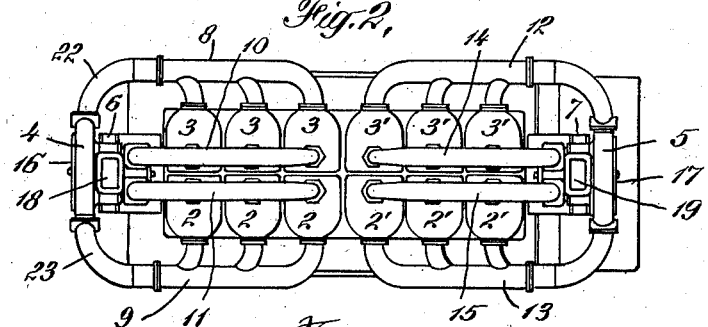
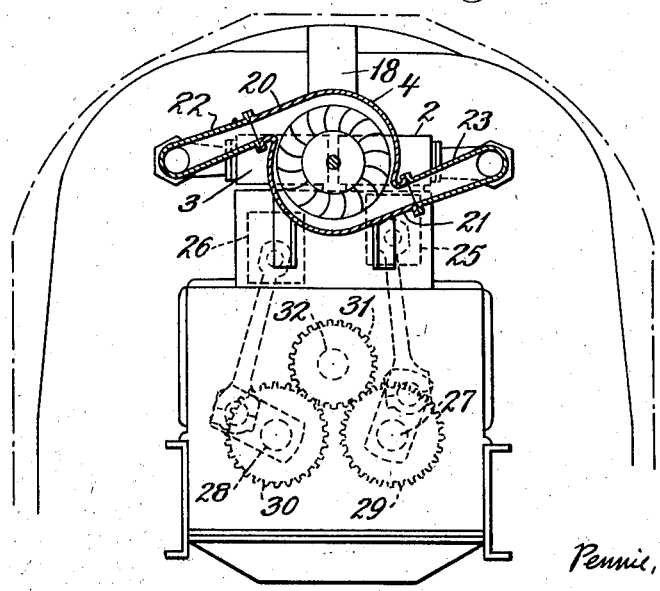
INVENTOR
Hans Heinzelmann
BY
Pennie, Davis, Marvin and Edmonds
ATTORNEYS Patented May 14, 1940

2,200,744

UNITED STATES PATENT OFFICE 2,200,744

BALANCED COMBUSTION ENGINE

Hans Heinzelmann, Effretikon, Switzerland, assignor to Sulzer Frères, Societe Anonyme, Winterthur, Switzerland Application May 21, 1936, Serial No. 80,961
In Switzerland May 31, 1935

8 Claims. (Cl. 60—13)

This invention relates to combustion engines in which the cylinders are arranged in two or more rows and exhaust into two or more exhaust-gas turbines, each of which drives a supercharging air compressor, and each cylinder is connected to only one supercharger. The invention consists in that each supercharger is connected to a bank of cylinders comprising corresponding cylinders of each row in such a way that on breakdown of one supercharger the conditions governing vibration, especially of the crankshafts of both rows of cylinders, are equally modified so that the vibration effects remain substantially unchanged.

Prior combustion engines, having two rows of cylinders and two superchargers, for example, were so constructed that one entire row of cylinders was connected to one supercharger and the other entire row of cylinders to the other supercharger. This known arrangement had the disadvantage that on breakdown of one of the superchargers one row of cylinders was no longer under the same load as the other row of cylinders. Thereby the mechanism effecting the synchronism of both rows of cylinders was overloaded to a considerable degree, because the vibration conditions of one crankshaft were changed considerably with respect to the vibration conditions of the other crankshaft. Consequently the equalization of the vibration effects was impaired.

In accordance with the present invention, the superchargers are preferably arranged at the ends of the combustion engine with their axes running parallel to the axis of the combustion engine and with the sides of the turbines facing the ends of the combustion engine. It is advisable to connect the exhaust of the cylinders to the nearest exhaust-gas turbine so that the heat radiation of the surface and the back-pressures opposing the exhaust energy are lessened. The air pipes leading to the working cylinders are preferably arranged on the compressor symmetrically to each other. In order to improve the conversion of the speed of the air into pressure, the connection between the compressor and the air pipe can be formed as a diffuser.

An example of a practical embodiment of the subject matter of the invention for a two-row engine is shown schematically in the drawing, in which:

Fig. 1 shows a side view of a combustion engine installation incorporating the invention;

Fig. 2 is a top view of the installation; and

Fig. 3 is an end view as seen from the left with the compressor shown in section.

The combustion engine 1 includes two rows of cylinders 2, 2' and 3, 3' at each end of which is mounted a supercharger consisting of an air compressor 4 or 5 driven by an exhaust-gas turbine 6 or 7, respectively. The cylinders of the engine are divided into two banks, one bank comprising the cylinders 2 and 3, and the other bank comprising the cylinders 2' and 3'. Each supercharger supplies air only to the bank of working cylinders which exhaust into the turbine of that supercharger. The pipes 8 and 9 connected to the compressor 4 are connected only to cylinders 2 and 3 which exhaust into the exhaust-gas turbine 6 through the pipes 10 and 11. In corresponding manner the compressor 5 delivers, through the pipes 12 and 13, air only to cylinders 2' and 3' from which the exhaust gases are led through the pipes 14 and 15 to the exhaust-gas turbine 7 which, in turn, drives the compressor 5. The superchargers 4, 6 and 5, 7 are secured at the ends of the combustion engine, the turbine sides facing the ends of the combustion engine and their axes running parallel to the axis of the combustion engine. The fresh air is drawn in through the openings 16, 17 and the exhaust gases are carried off by the exhaust pipes 18, 19. This construction allows the intake and exhaust pipes to be short and direct.

By the subdivision, thus effected, of the delivery of the air on the one hand, and of the carrying off of the exhaust gases on the other hand, there is obtained a reduction of the heat-radiating surface and of loss of exhaust energy. The pipes, or their sections, leading to the working cylinders are arranged on the supercharger symmetrically to each other, so that the turbo groups are mutually interchangeable. In order to promote the conversion of the speed of the air into pressure, the connection pipes 22, 23 between the compressors 4, 5 and the air pipes 8, 9 or 12, 13 are formed as diffusers.

As shown in Fig. 3, each row of cylinders 2 and 3 is provided with a plurality of pistons 25 and 26 which are connected to separate crankshafts 27 and 28, on which are mounted gears 29 and 30, respectively. The gears 29 and 30 each engage a common gear 31 which is mounted upon and drives the common or power shaft 32 of the engine.

By means of this invention the advantage is obtained that on breakdown of one supercharger each row of cylinders is affected in the same manner, and accordingly, the vibration conditions are also modified in the same manner. This eliminates the disadvantage of the previously known engines, in which, on non-equal or unsymmetrical change of operation of the rows of cylinders, the drive mechanism providing synchronism is subjected to greatly increased stresses. In such engines, on breakdown of one of the superchargers one row of cylinders is affected differently from the other row of cylinders; that is, if the supercharging fails in the first row of cylinders but not in the second, or if the cylinders in which the supercharging in the first row fails are at a different position in that row from the cylinders in which the supercharging fails in the second row and consequently fire at different times from the latter cylinders. This unbalance disturbs the oscillation cycle or dynamic balance of the crankshaft, as well as the mechanism transmitting the power to the drive shaft. The load on this drive mechanism may then be affected so unfavorably that in a short time serious mechanical damage will result. This damage can only be averted in accordance with this invention, if each bank of cylinders with its supercharger is arranged to comprise a completely balanced group within itself.

The foregoing description of a preferred embodiment of this invention relates to a Diesel or semi-Diesel combustion engine, although the principle involved may to good advantage be applied to any engine of comparable type.

I claim:

1. A combustion engine including a plurality of cylinders and superchargers grouped in banks, each bank comprising two rows of cylinders, each row of cylinders having its pistons connected to a separate shaft, drive means connecting each shaft to a common shaft, and a separate supercharger comprising an air compressor and an exhaust-gas turbine for each bank, each compressor and turbine being connected with the cylinders of its respective bank by pipes symmetrically disposed with respect to said bank.

2. A combustion engine of the Diesel type including a plurality of cylinders and superchargers grouped in banks, each bank comprising two rows of cylinders symmetrically disposed and dynamically balanced to minimize vibration, each row of cylinders having its pistons connected to a separate shaft and each shaft being operatively connected to a common shaft by means of gears and a separate supercharger supplying air exclusively to and operated exclusively by each bank through pipes symmetrically disposed with respect to said cylinders, whereby said superchargers and their connecting pipes are interchangeable.

3. A combustion engine in which the cylinders are arranged in a plurality of rows and exhaust into a plurality of exhaust-gas turbines, a separate crankshaft for each row of cylinders, an air compressor coupled to each turbine to comprise superchargers, each cylinder being coupled with only one air compressor, characterized in that each pair or group of cylinders lying in alignment transverse to the length of the crankshafts is supplied with supercharging air from one and the same supercharger.

4. In a combustion engine having two rows of cylinders, and a separate shaft for each row of cylinders connected to a common shaft, the improvement which comprises at least two turbines driven by exhaust gas, a supercharger driven by each turbine, an equal number of cylinders of each row connected to exhaust into and drive each turbine, and conduit means connecting each supercharger with an equal number of cylinders of each row, whereby each cylinder is connected to and supplied with compressed gas from one supercharger.

5. In a combustion engine having two rows of cylinders, and a separate shaft for each row of cylinders connected to a common shaft, the improvement which comprises, said cylinders being divided into at least two banks of cylinders, each bank containing an equal number of cylinders of each row, a turbine for each bank, conduit connecting the exhaust of each cylinder of each bank to the turbine for that bank, a supercharger driven by each turbine, and conduit means connecting each supercharger with each cylinder of the bank which connects to and drives the turbine driving that supercharger.

6. A combustion engine according to claim 5, comprising two banks of cylinders and two superchargers, one supercharger being mounted at each end of the engine with the axes of the engine and supercharger parallel.

7. A combustion engine according to claim 5, said engine being divided axially into two banks of cylinders and including two superchargers, one supercharger being mounted at each end of the engine and being driven by an exhaust-gas turbine operated by the exhaust gas of the adjacent bank of cylinders.

8. An internal combustion engine which comprises a plurality of banks of cylinders, a separate exhaust-gas turbine and supercharger operatively connected to each bank, each bank consisting of two rows of cylinders, each row of cylinders being connected to a separate crank shaft and each crank shaft being operatively connected to a common shaft by means of gears, each exhaust-gas turbine being driven by the exhaust gas from the cylinder to which it is connected, and a separate connection pipe connecting the supercharger with each row of cylinders of the bank to which the exhaust-gas turbine is connected, said connection pipe being formed as a diffuser, the internal diameter increasing in the direction of the cylinders.

HANS HEINZELMANN.